United States Patent [19]

Wilkinson

[11] 4,453,191
[45] Jun. 5, 1984

[54] OVERVOLTAGE DIRECTIONAL RELAY

[75] Inventor: Stanley B. Wilkinson, Havertown, Pa.

[73] Assignee: General Electric Company, King of Prussia, Pa.

[21] Appl. No.: 403,270

[22] Filed: Jul. 29, 1982

[51] Int. Cl.³ ............................................. H02H 3/38
[52] U.S. Cl. ................................................... 361/84
[58] Field of Search .................... 361/80, 81, 82, 83, 361/84

[56] References Cited

U.S. PATENT DOCUMENTS

| | | | |
|---|---|---|---|
| 4,161,011 | 7/1979 | Wilkinson | 361/80 |
| 4,296,451 | 10/1981 | Wilkinson | 361/83 X |
| 4,297,740 | 10/1981 | Hagberg | 361/84 X |
| 4,351,011 | 9/1982 | Liberman | 361/82 |

Primary Examiner—Harry E. Moose, Jr.
Attorney, Agent, or Firm—John P. McMahon; William Freedman

[57] ABSTRACT

Disclosed is an overvoltage directional relay that forms a part of a relay system which provides protection for a high voltage three phase transmission line. The overvoltage directional relay provides a high speed blocking function for use with the high speed tripping functions in the protective relay system. In one embodiment the directional relay utilizes the negative-sequence components of the three phase transmission lines. In another embodiment the directional relay utilizes the zero-sequence component of the three phase transmission line.

11 Claims, 10 Drawing Figures

RESPONSE OF RELAY X AND Y OF FIGURE 1 TO AN INTERNAL-($D_1$ DIRECTION)-FAULT

Fig. 7.

RESPONSE OF RELAY X AND Y OF FIGURE 1 TO AN EXTERNAL-($D_0$ DIRECTION)-FAULT $V_{OP} > V_{REST}$ ∴ 68(BLOCK) OUTPUT $V_{REST} > V_{OP}$ ∴ NO 68(BLOCK) OUTPUT

Fig. 8.

Fig. 9.
RESPONSE OF RELAY X2 OF FIGURE 8 TO AN INTERNAL-TYPE (SLG) FAULT $V_{REST} > V_{OP}$ ∴ NO 68(BLOCK) OUTPUT

Fig. 10.
RESPONSE OF RELAY X1 OF FIGURE 8 TO AN EXTERNAL-TYPE (SLG) FAULT $V_{OP} > V_{REST}$ ∴ 68(BLOCK) OUTPUT

ID RELAY

CROSS REFERENCE TO RELATED APPLICATIONS

The subject matter of this application is related to that of my application Ser. No. 403,269, filed July 29, 1982, and assigned to the same assignee of the present invention.

BACKGROUND OF THE INVENTION

The present invention relates to a protective system for a three phase high voltage transmission line, and more particularly, to an overvoltage directional blocking relay having means to more correctly sense the presence of an external fault, i.e., a fault behind the relay location.

As the voltage and current ratings and the length of transmission lines have increased, greater emphasis has been placed on decreasing the operating times for the protective relays associated with such lines so as to provide shorter fault clearing times. The desired relay operating times may be relatively small compared to the time constants of the natural frequency transients on long high voltage transmission lines.

In a directional comparison relaying system for a transmission line, there are typically directional relays at opposite terminals of the line, and each comprises a tripping unit and a blocking unit. If the tripping unit at one line terminal senses fault current flowing into the transmission line through this one terminal, it will act to produce tripping of a circuit breaker at this terminal unless the tripping unit is blocked from producing such tripping by a blocking signal received from the relay at the opposite terminal of the line. The primary purpose of the blocking unit of the relay system at the opposite terminal is to transmit a blocking signal if the fault that produced the fault current is external to the transmission line. If the fault is an internal fault, no blocking signal is transmitted and the tripping unit at the one end is free to produce tripping in response to the fault.

Since operation of the tripping unit must usually be delayed until the blocking unit of the relay at the opposite line terminal has had an opportunity to determine whether the fault is internal or external and to transmit a blocking signal if the fault is external, it is important to high speed tripping of the circuit breaker on internal faults, and hence minimum delay time, that such blocking unit be capable of quickly establishing whether the fault is an external one.

For long line applications, certain difficulties are encountered in quickly establishing the presence of an external fault. Some of these difficulties result from the fact that immediately following fault occurrence, the fault current in the line is the current associated with travelling waves propagated into the line by the fault. The steady-state fault current, which is the current that the usual blocking relay responds to, is established only after some time has elapsed relative to the initiation of the travelling waves; and this can delay response of the blocking relay to an external fault.

An object of my invention is to provide a blocking relay of the overvoltage directional type which is capable of correctly responding very rapidly to an external fault, even in long line applications where travelling waves may persist for a relatively long period.

Another condition that can cause problems for directional relays is the failure of one or two phase potentials on a three phase system. Such a failure typically causes the presence of negative sequence voltage and the absence of negative sequence current, which conditions, in turn, may cause tripping relays to operate erroneously.

A further problem that may result from slow operation of the blocking relays is one that arises in those applications where the relays are fed from parallel current transformers and the fault current is such as to produce a reasonable probability of current transformer saturation. If the prefault residual flux levels in the current transformers are such that an adversely located current transformer saturates rapidly (whereas another current transformer saturates slowly); then, if the operating times of the blocking relays are delayed, the adversely located current transformer may saturate before the blocking relays operate, creating the possibility that the lack of operation of the blocking relays will allow the trip relays to operate and cause a false trip.

A further difficulty is involved with blocking relays utilizing negative or zero sequence components in that the operation may be degraded when a fault is located on a parallel line such that the negative (and/or the zero) sequence voltage at each end of the protected line is approximately equal. Thus, the negative (and/or zero) sequence relay current at each end of the protected line is established by the negative (and/or zero) sequence voltage at the line terminals and the net shunt impedance in the line, which is typically capacitive. The capacitive shunt impedance produces a current in the relay that may cause the external fault in the parallel line to appear as an internal fault in the protected line to a negative (or zero) sequence directional unit.

Accordingly, it is an object of the present invention to provide a directional overvoltage relay utilizing the negative (or zero sequence) components having means to correctly distinguish the fault current associated with external fault conditions.

It is a further object of my invention to provide more reliable detection of external faults where the current transformers are driven into their undesirable saturation condition.

A still further object of my invention is to provide a means for detecting potential failure of one or two phase potentials on a three phase system and initiating transient blocking of the tripping relays.

It is a still further object of this invention to provide a directional overvoltage relay that is minimally affected by travelling waves on long lines, and is capable of fast operation in the presence of said travelling waves.

These and other objects of the present invention will become apparent to those skilled in the art upon consideration of the following description of the invention.

SUMMARY OF THE INVENTION

The present invention is directed to an overvoltage directional relay.

In one embodiment the overvoltage directional relay for association with a three phase transmission line is adapted to provide a blocking signal in response to the occurrence of a fault behind the relay but providing no blocking signal in response to the occurrence of a fault on the transmission line in front of the relay. The relay comprises:

(a) means for developing quantities $V_2$ and $I_2 Z_R$, where:

$V_2$ is a signal representative of the negative sequence component of the phase to ground or phase to phase voltages of the transmission line, $I_2$ is a signal representative of the negative sequence component of the phase currents of the transmission line when $V_2$ is related to phase to ground voltages and is a signal representative of the negative sequence component of the delta currents when $V_2$ is related to phase to phase voltage, $Z_R$ is a replica impedance of the equivalent negative sequence source impedance behind the relay and is of a magnitude equal to or greater than one-half of said equivalent negative sequence source impedance, (b) summing means for summing $K_1V_2$ and $(K_2)(K_3)I_2Z_R$ and developing an operating signal $V_{OP}$ which is proportional to the sum of $K_1V_2$ and $(K_2)(K_3)I_2Z_R$, where $K_1$, $K_2$, and $K_3$ are selectable constants, (c) means for developing a restraining signal $V_{REST}$ which is proportional to $K_2I_2Z_R$, (d) amplitude comparator means for comparing the amplitude of operating signal $V_{OP}$ with the amplitude of the restraining signal $V_{REST}$ and for developing a blocking signal when the amplitude of $V_{OP}$ exceeds $V_{REST}$.

The features of the invention believed to be novel are set forth with particularity in the appended claims. The invention, itself, however, both as to its organization and operation together with further objects and advantages thereof may best be understood by reference to the following description taken in conjunction with the accompanying drawings.

DETAILED DESCRIPTION OF THE PREFERRED EMBODIMENT

Figure 1:
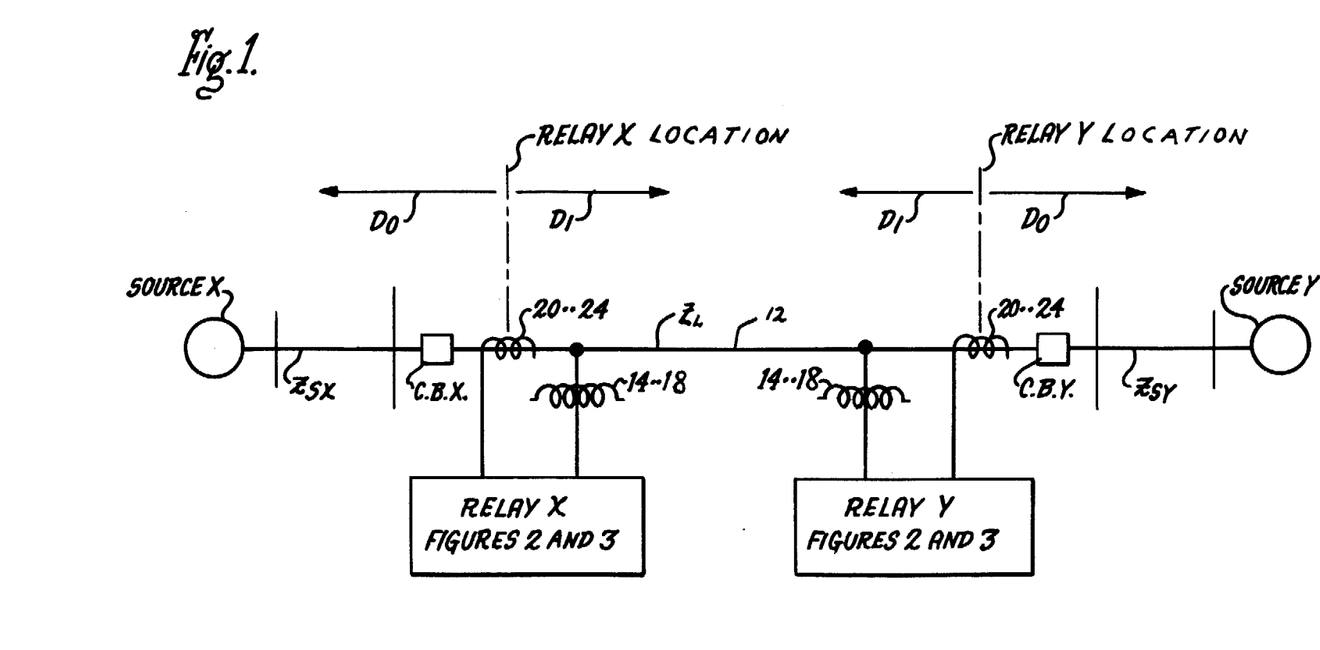
FIG. 1 is a one line representation of a transmission line for a three (3) phase A.C. power system showing the location of the relays of the present invention relative to the zone of the transmission line which is desired to be protected.

FIG. 1 is a one-line representation showing a transmission line 12 interconnecting two Power Sources, shown in FIG. 1 as Sources X and Y having respectively, source impedances $Z_{SX}$ and $Z_{SY}$. FIG. 1 further shows circuit breakers C.B.X and C.B.Y respectively interconnecting the Sources X and Y with the transmission line 12. The C.B.X is associated with RELAY X as shown in FIG. 1, whereas, C.B.Y is associated with RELAY Y as shown in FIG. 1.

The portion of the power system that is located behind the location of RELAY X is indicated by the arrow $D_O$ and the portion of the power system in front of RELAY X is indicated by the arrow $D_1$ at the RELAY X location. At the relay Y location, arrow $D_O$ indicates the portion of the power system behind the location of relay Y, and the arrow $D_1$ indicates the portion of the system ahead of the RELAY Y location.

As will be described hereinafter, the overvoltage directional relay of the present invention detects and responds to a fault located in the $D_O$ portion of the system, and, conversely the overvoltage directional relay of the present invention has compensation means so as not to be affected by a fault condition in the $D_1$ portion of the system. FIG. 1 shows RELAYS X and Y, each having a circuit arrangement of FIG. 3 to be described, both coupled to the transmission line via devices 14 ... 24 which are shown most clearly in FIG. 2.

Figure 2:
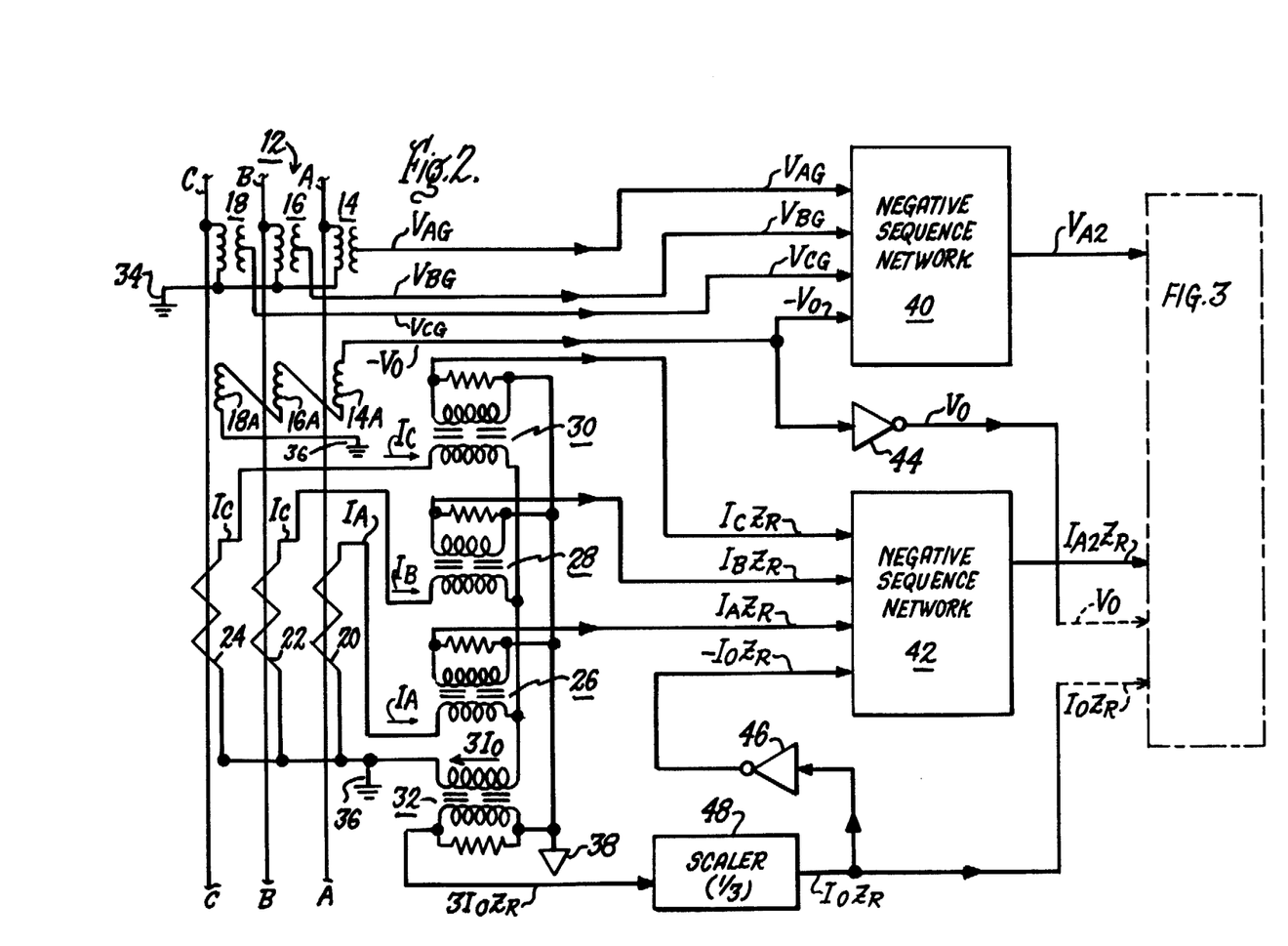
FIG. 2 is a block diagram for developing the signals for the circuit arrangement of FIG. 3 of the present invention.

The circuit arrangement of FIG. 2 is shown as being coupled to receive a plurality of source signals mainly comprised of $I_A$, $I_B$, $I_C$, $3I_O$, $V_{AG}$, $V_{BG}$, and $V_{CG}$ and $-V_O$, the first four of which are representative of the current conditions within the three phase transmission line 12 and the second four of which are representative of the voltage conditions within the three phase transmission line 12. The circuit arrangement of FIG. 2 and also the remaining FIGS. 3-10 show and describe the present invention with reference to phase A quantities. It should be recognized that the present invention is equally applicable to the development and usage of the phase B or phase C quantities.

Figure 3:
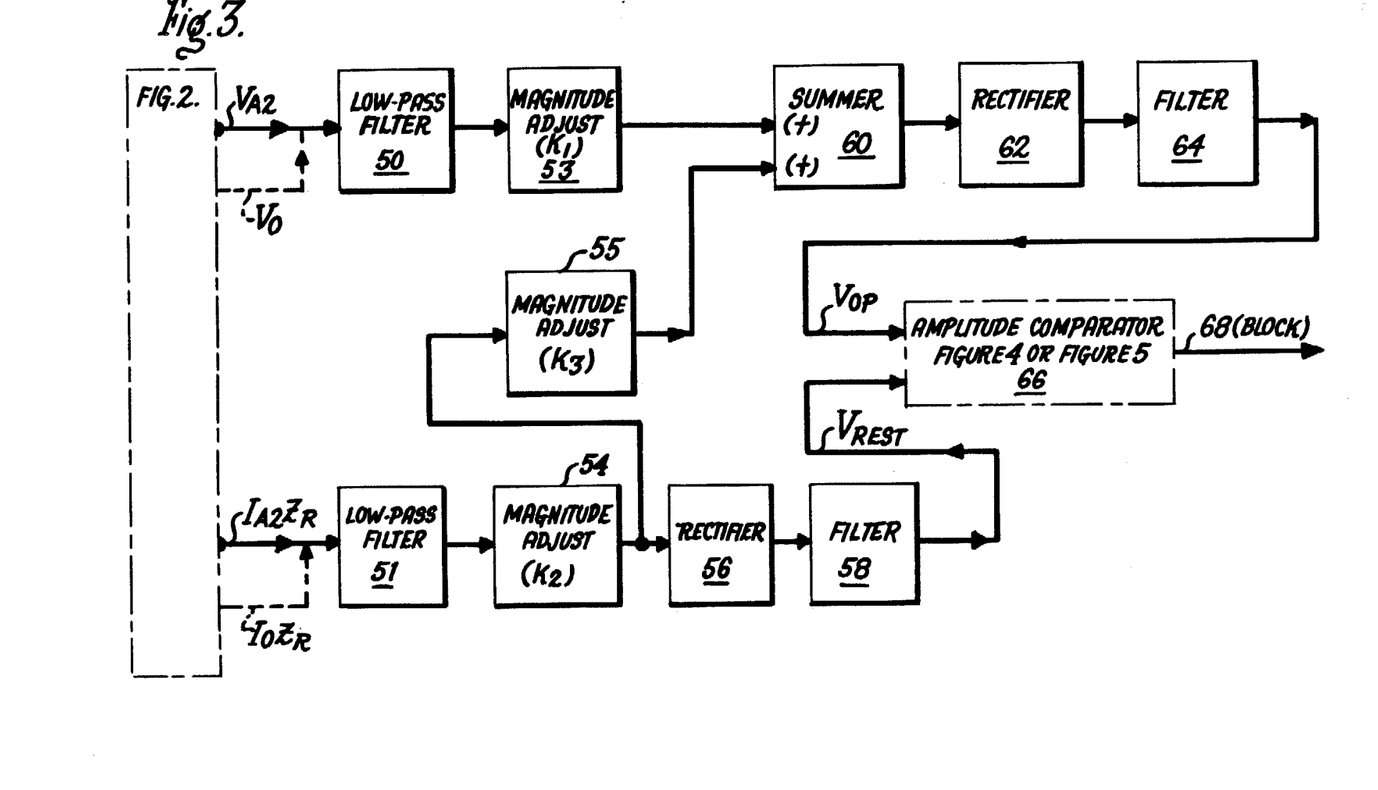
FIG. 3 is a circuit arrangement of one embodiment of the present invention.

The circuit arrangement of FIG. 2 receives the source signals and further develops these signals into desired quantities which are routed to the circuit arrangement of FIG. 3. Table 1 lists the received source signals, the developed signals of FIG. 2, the signals shown in FIGS. 3 and 4 and also gives a general definition for each of the listed signals.

TABLE 1

| Quantities | General Definition |
|---|---|
| $I_A$, $I_B$ and $I_C$ | Current signals respectively representative of current flowing within phases A, B, and C of the transmission line 12. |
| $V_{AG}$, $V_{BG}$, and $V_{CG}$ | The voltages respectively representative of the voltage between phases A, B, and C and Ground of the transmission line 12. |
| $I_O$ | A current signal representative of the zero-sequence component of the phase currents flowing within the three (3) phase transmission line 12. |
| $V_O$ | A voltage signal representative of the zero-sequence component of the phase-to-ground voltages existing within the three phase transmission line 12. |
| $Z_R$ | A replica impedance of the equivalent negative sequence source impedance behind the relay and is of a magnitude equal to or greater than one-half of the equivalent negative sequence source impedance. |
| $V_{A2}$ | A signal representative of the negative sequence component of the phase-to-ground voltages of the transmission line, referenced to the phase A to ground voltage. |

TABLE 1-continued

| Quantities | General Definition |
|---|---|
| $I_{A2}$ | A signal representative of the negative sequence component of the phase currents of the transmission line, referenced to the phase A current. |
| $K_1$ | The constant associated with the adjustment of the $V_{A2}$ (or $V_O$) quantities of FIG. 3. |
| $K_2$ and $K_3$ | The constants associated with the adjustment of the $I_{A2}Z_R$ (or $I_OZ_R$) quantities of FIG. 3. |
| $V_{OP}$ | The operating signal of the overvoltage directional relay. |
| $V_{REST}$ | The restraint signal of the overvoltage directional relay. |

The voltage quantity $V_{A2}$ of the Table 1 may be generically stated for phase to ground voltages or phase-to-phase voltages related to phases A, B, and C without the subscript A and expressed accordingly as $V_2$. Similarly, the current quantity $I_{A2}$ of Table 1 may be generically stated without the subscript A and expressed accordingly as $I_2$ for (1) the negative sequence component of the phase currents $I_A$, $I_B$, and $I_C$ of the transmission line when $V_2$ is related to phase to ground voltages or (2) the negative sequence component of the delta currents $(I_A-I_B)$, $(I_B-I_C)$ and $(I_C-I_A)$ when $V_2$ is related to phase to phase voltages.

FIGS. 2 and 3 also show phasor quantities $I_{A2}Z_R$, $I_OZ_R$, not listed nor generally described in Table 1, but which are to be discussed hereinafter with regard to their applicable relationship to the present invention.

Figure 4:
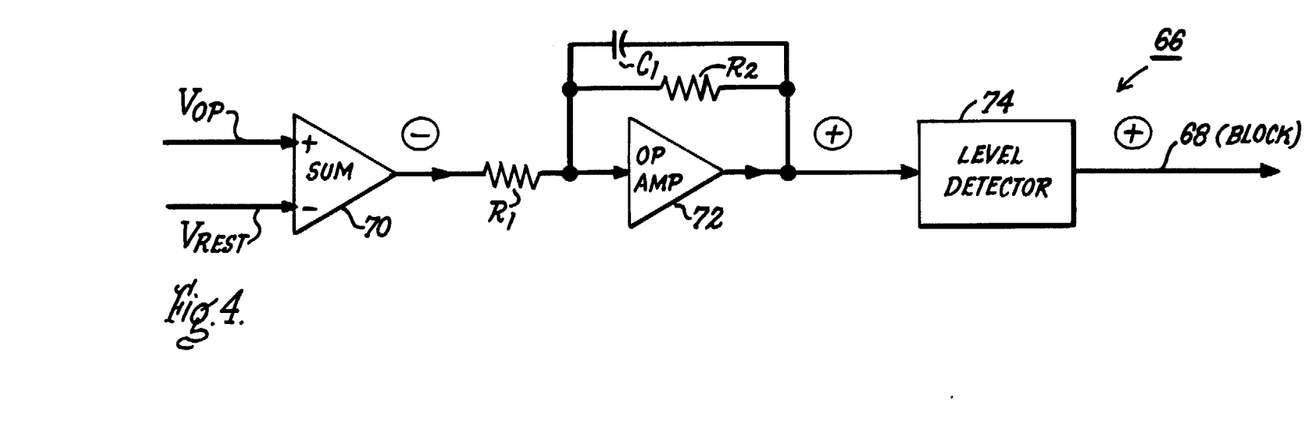
FIGS. 4 and 5 show alternate embodiments of the Amplitude Comparator of FIG. 3.
Figure 5:
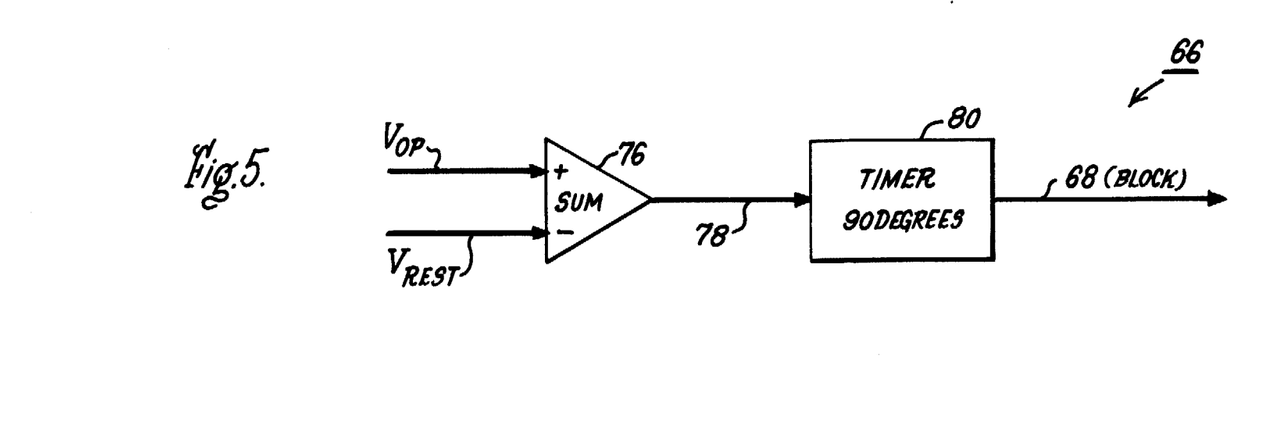

Circuit arrangements shown in FIGS. 2, 3, 4 and 5 are comprised of a plurality of conventional-type elements with the exception of the negative sequence networks 40 and 42 of FIG. 2 and the TIMER 80 of FIG. 5. The negative sequence networks 40 and 42 may be of the type described in U.S. patent application Ser. No. 297,542, of M. Hodges filed Aug. 31, 1981 which is assigned to the same assignee of the present invention. TIMER 80 may be of the type described in U.S. patent applications of T. B. Breen having Ser. Nos. 369,440, now U.S. Pat. No. 4,420,789 and 378,589 filed Apr. 19, 1982 and May 17, 1982, respectively, or it may be of the type described in my U.S. Pat. No. 4,161,011 issued July 10, 1979. All referenced U.S. patents and U.S. patent applications are assigned to the same assignee of the present invention. All the above referenced U.S. patents and U.S. patent applications are herein incorporated by reference.

As previously discussed the generic quantities $V_2$ and $I_2$ are related respectively to, phase-to-ground and phase-to-phase voltages, and phase currents and delta currents. For the description to follow the potential transformers 14, 16 and 18 of FIG. 2 are described as arranged so as to develop phase-to-ground type voltages and the current transformers 20, 22, and 24 of FIG. 2 are described as arranged so as to develop phase type currents. Although only the phase-to-ground voltages and phase currents are described, it should be recognized that I also contemplate the use of the phase-to-phase voltages and delta type currents in the practice of my invention in a manner similar to the description given hereinafter.

FIG. 2 shows current transformers 20, 22, and 24 respectively coupled to phases A, B, and C of the transmission line 12. FIG. 2 further shows one end of each of the current transformers connected to a substation ground 36. The current transformers 20, 22 and 24 are respectively coupled to the primary winding of transactors 26, 28, and 30 so as to respectively receive the coupled signal $I_A$, $I_B$, and $I_C$. The other side of the primary winding of each transactors 26, 28, and 30 is coupled to one side of the primary winding of transactors 32 having its other side connected to the other side of each of the current transformers 20, 22 and 24. The arrangement of transactors 26, 28, 30 and 32 develops the signal $3I_O$ across the primary winding of transactor 32. Transactor 32 has one end of its primary winding connected to the substation ground 36.

One side of each of the secondary windings of transactors 26, 28, 30 and 32 is coupled to a reference potential 38 of the power supply for the protective relay. The transactors 26, 28, 30 and 32 each have their turns ratio, transfer impedance and resistive loading selected so as to multiply their respectively coupled signals $I_A$, $I_B$, $I_C$ and $3I_O$ by the quantity $Z_R$ so that the transactor 26, 28, 30 and 32 respectively develop the quantities $I_AZ_R$, $I_BZ_R$, $I_CZ_R$ and $3I_OZ_R$.

As further shown in FIG. 2, there are three potential transformers 14, 16, and 18, each comprising a primary winding, one side of which is coupled to a system ground 34. The other side of the primary windings of potential transformers 14, 16, and 18 are respectively coupled to phases A, B, and C of the transmission line 12 so that the potential transformers 14, 16 and 18 develop respectively the quantities $V_{AG}$, $V_{BG}$ and $V_{CG}$ at their secondary windings. The potential transformers 14, 16, and 18 each have a tertiary winding $14_A$, $16_A$ and $18_A$ respectively. The tertiary windings $14_A$, $16_A$ and $18_A$ are arranged in a broken-delta connection across phases A, B, and C as shown in FIG. 2. The tertiary winding $18_A$ has one of its ends connected to substation ground 36. The tertiary windings $14_A$, $16_A$ and $18_A$ have a desired turns ratio so as to develop the quantity $-V_O$. The signal $V_{AG}$, $V_{BG}$, $V_{CG}$ and $-V_O$ are routed to the Negative Sequence network 40 which develops one of the output signals $V_{A2}$ of the circuit arrangement of FIG. 2.

The signal $3I_OZ_R$, developed by transactor 32, is routed to a Scaler 48 having a selected scaling constant of ($\frac{1}{3}$) so as to develop the quantity $I_OZ_R$. The signal $I_OZ_R$ is another output signal of the circuit arrangement of FIG. 2 and is also routed to Signal Inverter 46 which develops the quantity $-I_OZ_R$ that is further applied as a reference signal to Negative Sequence network 42. The output signals $I_AZ_R$, $I_BZ_R$ and $I_CZ_R$ of transactors 26, 28 and 30, respectively, are also routed to the Negative Sequence network 42 so as to develop the output quantity $I_{A2}Z_R$ of the circuit arrangement of FIG. 2.

The signal $-V_O$, developed by tertiary windings $14_A$, $16_A$ and $18_A$, is routed to a Signal Inverter 40 which develops a signal $V_O$. The signal $V_O$ is another output signal of the circuit arrangement of FIG. 2.

In one embodiment of the present invention the output signals $V_{A2}$ and $I_{A2}Z_R$ of FIG. 2 are applied to the arrangement shown in FIG. 3. In a second embodiment of the present invention the output signal $V_O$ and $I_OZ_R$ of FIG. 2 are applied to the circuit arrangement of FIG. 3. The signal paths of the second embodiment quantities $V_O$ and $I_OZ_{RO}$ are shown in phantom in FIGS. 2 and 3. The following description of FIG. 3 only describes the further development of the signals of the first embodiment $V_{A2}$ and $I_{A2}Z_R$, however; it should be recognized that unless otherwise specified the description of FIG. 3 related to $V_{A2}$ and $I_{A2}Z_R$ is equally applicable to the quantities of the second embodiment $V_O$ and $I_OZ_R$ respectively. In this second embodiment, $V_O$ is used in place of $V_{A2}$ of the first embodiment; and $I_OZ_R$ is used in place of $I_{A2}Z_R$ of the first embodiment.

FIG. 3 shows the signal $V_{A2}$ as applied to a Filter 50 and signal $I_{A2}Z_R$ as applied to a Filter 51. Filters 50 and 51 are of the low-pass type and attenuate high frequency transients that may be present on signals $V_{A2}$ and $I_{A2}Z_R$ respectively. The filtered signal $V_{A2}$ of Filter 50 is applied to Magnitude Adjust ($K_1$) 53 having an adjustment constant $K_1$. The Magnitude Adjust 53 develops an output signal which is applied to the (+) input of Summer 60. The filtered signal $I_{A2}$ of Filter 51 is applied to a Magnitude Adjust ($K_2$) 54 having an adjustment constant of $K_2$. The Magnitude Adjust 54 develops an output signal which is applied to both, (1) Rectifier 56, and (2) Magnitude Adjust ($K_3$) 55. Magnitude Adjust ($K_3$) 55 has an adjustment constant $K_3$ and develops an output quantity that is routed to a (+) input of the Summer 60.

Summer 60, operating in a well known manner, sums the signal $V_{A2}$ (capable of being adjusted by the constant $K_1$) applied to one of its (+) inputs with the signal $I_{A2}Z_R$ (capable of being adjusted by the constants $K_2$ and $K_3$) applied to the other of its (+) inputs. These constants $K_1$, $K_2$ and $K_3$ are to be further discussed hereinafter with regard to the $V_{OP}$ and $V_{REST}$ signals of FIGS. 6, 7, 9 and 10.

The Summer 60 develops its summed output signal which is routed to a cascaded arrangement comprising a Rectifier 62 and Filter 64. The Rectifier 62 converts the A.C. type signal output of Summer 60 to a D.C. type signal proportional in magnitude to the output from Summer 60, and this D.C. signal is applied to Filter 64 so as to filter or smooth out the A.C. ripple that may be present on the converted signal of Rectifier 62. The output signal of Filter 64 is the operate $V_{OP}$ signal of the present invention and is essentially expressed by the expression $V_{A2}+I_{A2}Z_R$. It should be recognized that the $V_{OP}$ signal may be more exactly expressed as $K_1V_{A2}+K_2K_3I_{A2}Z_R$.

The restraint $V_{REST}$ signal of the present invention is essentially expressed by the quantity $I_{A2}Z_R$ and is developed by the cascaded arrangement of Low-Pass Filter 51, Magnitude Adjust ($K_2$) 54, both previously discussed, Rectifier 56 and Filter 58. It should be recognized that the restraint signal may be more exactly expressed as $K_2I_{A2}Z_R$. Rectifier 56 and Filter 58 related to the $V_{REST}$ signal operate in a similar manner as described for Rectifier 62 and Filter 64 respectively.

The $V_{OP}$ and $V_{REST}$ are applied to an Amplitude Comparator 66 which develops the output signal 68 (BLOCK) of circuit arrangement of FIG. 3. The Amplitude Comparator 66 may either be of the type circuit shown in FIG. 4 or the type circuit shown in FIG. 5.

FIG. 4 shows the Amplitude Comparator 66 as comprised of a cascaded arrangement of a (1) Summer (SUM) 70, (2) an Operational Amplifier (OP AMP) 72 arranged with an input resistor $R_1$ and feedback network comprised of a parallel arrangement of $R_2$ and $C_1$, and (3) a Level Detector 74. FIG. 4 further shows, the output stage of the SUM 70 as having a negative circled notation $\ominus$, the output of OP AMP 72 as having a positive circled $\oplus$ notation, and the output of Level Detector 74 as having a positive circled notation $\oplus$.

The notation $\ominus$ of SUM 70 is meant to represent that the SUM 70 provides a negative level output when the $V_{OP}$ quantity applied to SUM 70 exceeds the $V_{REST}$ quantity applied to SUM 70.

The notation $\oplus$ of OP AMP 72 is meant to represent that the OP AMP 72 develops a positive level signal output in response to receipt of the negative level output of SUM 70.

The notation $\oplus$ of Level Detector 74 is meant to represent that the Level Detector 74 develops a positive level signal, which is signal 68 (BLOCK), in response to receipt of the positive level output of OP AMP 72 having a value which exceeds a preselected value for the level of Level Detector 74.

The OP AMP 72 and its associated circuit components $R_1$, $R_2$ and $C_1$ are selected to receive the input signal from SUM 70 and develop an output signal having some degree of integration relative to its received signal. The OP AMP 72 and its associated circuit components $R_1$, $R_2$ and $C_1$ receive the output signal from the SUM 70 and develop after a time delay a positive level signal in response to the receipt of the negative level output signal of the SUM 70. The components $R_1$, $R_2$ and $C_1$ are selected so as to provide a preselected time constant. The selections of OP AMP 72 and components $R_1$, $R_2$ and $C_1$ are such that its developed signal follows the amplitude difference between the signals $V_{OP}$ and $V_{REST}$ so that: (1) operation is prevented, by providing a delayed response to the ripple type of signals that may be present out of Filters 58 and 64 when the magnitude of $V_{REST}$, before the Filter 58,is equal to or larger than $V_{OP}$, before Filter 64, and (2) the operating time of the relay of the present invention bears an appropriate inverse relationship to the magnitude of the output of the Summer 70 when $V_{OP}$ is larger than $V_{REST}$.

The Amplitude Comparator of FIG. 4 operates in such a manner that if a fault, behind the transmission line 12, occurs relatively near or close-in to the location of the relay of the present invention, typically creating a $V_2$ quantity having a relatively large magnitude, then the circuit of FIG. 4 responds relatively rapidly. Conversely, if a fault occurs at a location relatively remote from the relay of the present invention, typically creating a quantity $V_2$ having a relatively low magnitude, then the circuit of FIG. 4 responds relatively slowly. The relay of the present invention, by the use of the magnitude of quantity $V_2$ to determine the speed of response of the circuit of FIG. 4 conforms to the protection desired for the transmission line 12 and eliminates undesired block relay operation.

Figure 8:
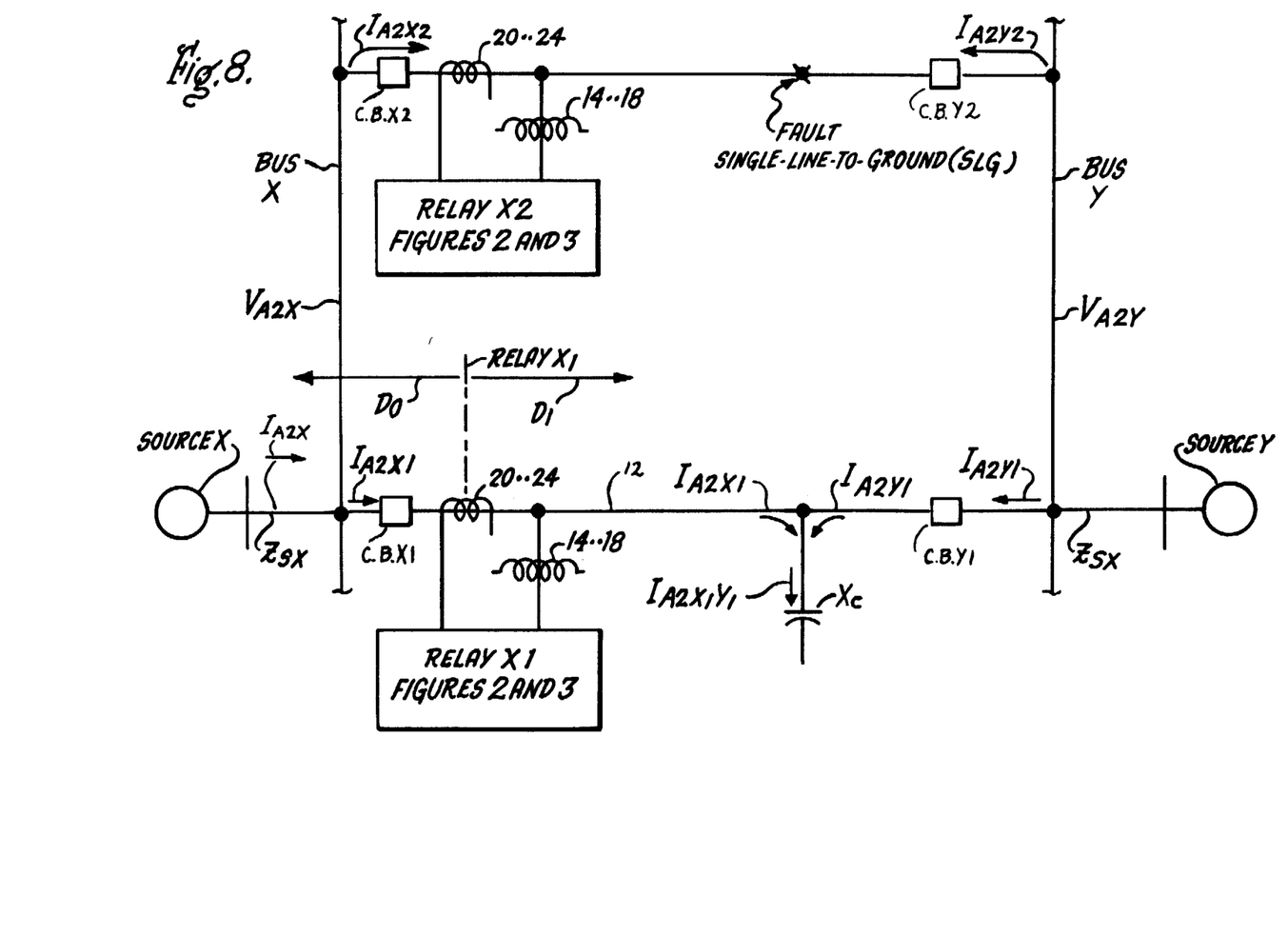
FIG. 8 is a one line representation showing the RELAYS X1 and X2 of the present invention and the occurrence of a Single-Line-To-Ground (SLG) Fault on a parallel transmission line.

The rapid response of the circuit of FIG. 4 to close-in faults reduces the problems discussed in the "Background" related to the current transformer saturation conditions and provides the coordination with relay trip units at the remote end of the transmission line 12. Similarly, the longer response of the circuit of FIG. 4 to remote faults beyond the reach of remote trip units tends to eliminate unnecessary blocking relay operation in response to external incidents, such as, for example, circuit switching and very remote faults. The desired response of my present invention to further type faults is to be further described hereinafter with regard to a further discussion of my relays as shown in FIGS. 1 and 8.

The second embodiment of the Amplitude Comparator 66 is shown in FIG. 5 as comprising a summing amplifier (SUM) 76 and a TIMER 80. The circuit of FIG. 5 operates in a different manner than FIG. 4 in that it operates to develop a substantial instantaneous output signal 68 (BLOCK) if the amplitude of the quantity $V_{OP}$ exceeds the $V_{REST}$ quantity for a predetermined duration established by TIMER 80.

TIMER 80 is shown in FIG. 5 as having a quantity of 90° representative of a time duration of 4.16 msec (60 Hz) or 5.0 msec (50 Hz). As previously mentioned, TIMER 80 may be of the type described in U.S. patent applications having Ser. Nos. 369,440 and 378,589 and reference may be made to these U.S. applications for a more detailed description of a TIMER, such as TIMER 80, and a more detailed description of the mentioned quantities 90°, 4.16 msec, and 5.0 msec.

The circuit of FIG. 5 typically develops an output signal 68 (BLOCK) when the quantity $V_{OP}$ exceeds the quantity $V_{REST}$ for a 90° phase duration corresponding to time duration of 4.16 msec or 5.0 msec.

In general, my present invention is concerned with a negative sequence or zero sequence directional relay used to detect faults in the non-trip direction, and which forms a part of a protective system (not shown) for high voltage three phase transmission lines such as transmission line 12 of FIG. 1. In one embodiment of the present invention, the operating concept, to be further discussed hereinafter, of the blocking relay of FIGS. 2 and 3 may be described as an overvoltage directional relay since the relay has a net operating signal $V_{OP}$ of FIG. 3, that is essentially equal to the negative sequence voltage $V_{A2}$ of FIG. 3 at the relay for faults in the non-trip direction shown in FIG. 1 as $D_O$ for both RELAYS X and Y.

My invention selects the polarity of $I_{A2}Z_R$ such that it is essentially in phase with $V_{A2}$ for an external fault and essentially 180° out of phase with $V_{A2}$ for an internal fault. Further my invention, by means of the circuit arrangement of FIG. 3, compares the magnitude of the phasor sum of the operating signal $V_{OP}$ ($V_{A2}+I_{A2}Z_R$) and the restraining signal $V_{REST}$ ($I_{A2}Z_R$), by means of SUMMER 60 of FIG. 3, where the angle of $Z_R$ is selected by means of transactors 26 . . . 30 of FIG. 2 to be approximately equal to the negative sequence impedance angle of the transmission line 12. As is to be further discussed, the approximate $Z_R$ quantity is selected to be that of the equivalent negative sequence source impedance behind the relay and of a magnitude equal or greater than one-half ($\frac{1}{2}$) of that equivalent negative sequence source impedance.

A selection of $Z_R$ of this approximate value provides $I_{A2}Z_R$ as an essentially in phase quantity with $V_{A2}$ quantity of the transmission line 12 for fault conditions in the non-trip $D_O$ direction of FIG. 1, and essentially 180° out-of-phase with $V_{A2}$ quantity for internal faults shown in FIG. 1 in the direction $D_1$. Thus, the net operating signal i.e., ($V_{OP}$)−($V_{REST}$) is approximately equal to ($V_{A2}+I_{A2}Z_R$)−($I_{A2}Z_R$) which is approximately equal to the $V_{A2}$ quantity. The approximation is a consequence of the anticipated minor variation in the negative sequence impedance angles for the line and for the Sources X and Y of FIG. 1. The net restraining signal on an internal fault is equal to the expression ($V_{REST}$)−($V_{OP}$) which is equal to the expression (−$I_{A2}Z_R$)−($V_{A2}+I_{A2}Z_R$) which may be restated as approximately 2 ($I_{A2}Z_R$)−$V_{A2}$. Since the $V_{A2}$ quantity for an internal fault is equal to the equivalent negative sequence source impedance behind the relay ($Z_{S2}$) multiplied by the current $I_{A2}$ flowing within transmission line 12 of FIG. 1, then operation of the blocking directional relay of the present invention is prevented if in the present invention $Z_R$ is selected equal or greater than one-half the equivalent negative sequence source impedance behind the relay ($Z_{S2}$). A typical setting of $Z_R$ is approximately equal to or slightly larger than $Z_{S2}$. These desired selections of $Z_R$ will be further described hereinafter.

As will become apparent hereinafter, my invention provides several advantages or features over known prior art devices. One feature of my invention is that the initial fault current through a long line, for a fault just behind the relay location, is essentially travelling wave currents. These currents tend to produce transient delays in prior art directional relays designed for steady state operation since the voltage signal is primarily the fundamental frequency, whereas the current signal initially has the frequency components associated with the travelling waves. However, for bolted, unbalanced faults immediately behind the relay where high operating speed is most desirable in a blocking relay, the negative sequence voltage $V_{A2}$ will be a maximum for that fault type, thus establishing a large component of the operating signal $V_{OP}$ due to voltage in the invention herein described. Conversely, the quantity $I_{A2}Z_R$ will tend to be rather small since $I_{A2}$ is initially limited by the surge impedance of the line which typically is very much larger than $Z_{S2}$ (and hence $Z_R$). Thus the signal $V_{A2}$ is much larger than the signal $I_{A2}Z_R$, resulting in high speed operation. This high speed operation is required because as discussed in the "Background" Section, there is a danger of saturation of an adversely located current transformer (CT) that could cause misoperation of the trip relays.

A second feature of my inventive concept substantially improves the reliability of a blocking directional relay where a fault in a parallel line results in the fault current in the relays in the protected line, so as to cause the fault to appear as internal to the protected line. This situation may occur when the negative sequence voltage at each end of the line is approximately equal for a fault in the parallel line. As a consequence, the fault current in the relays is flowing in the line shunt capacitance, thus causing a 180° phase shift compared to an "inductive source impedance", and hence producing a phase relationship between $I_{A2}$ and $V_{A2}$ that would be normally interpreted as an internal fault. The invention would see the fault as external if the setting of $Z_R$ was less than the magnitude of the shunt capacitive impedance ($X_C$) (and assuming both ends closed). The typical setting of $Z_R$ would be expected to be many times smaller than $X_C$. Thus, as will be described hereinafter with regard to FIGS. 8, 9 and 10 my invention correctly distinguishes an external fault condition from an internal fault condition.

A still further feature of my invention results from its capability to operate in the presence of negative sequence voltage and the absence of negative sequence current. One advantage is that the blocking directional relay will operate on the failure of one or two phase potentials on a three phase system, and hence the operation of the blocking unit can be used to block the trip units should they attempt to operate as a result of the phase potential failure.

My inventive concept and its related advantages may best be further described by first discussing the desired selection of the $Z_R$ quantity.

The selection of the desired value for $Z_R$ takes into account two types of faults. The first is an external fault which is to be described relative to the location of RELAY X and at a position behind the location of RELAY X of FIG. 1. The external fault is detected by RELAY X as such so that RELAY X does generate the signal 68 (BLOCK). The second fault is an internal fault which is also to be described relative to the location of RELAY X and at a position near the location of RELAY X of FIG. 1, more particularly, a position just in front of RELAY X along the transmission line 12 between RELAYS X and Y. The internal fault is detected by RELAY X as such so that RELAY X does not generate the signal 68 (BLOCK). Further, the selection of the desired value of $Z_R$ takes into account typical fault currents, and voltages, typical line and source impedances converted to secondary quantities as seen by the relay of the present invention. For example, the fault voltage $V_{A2}$ of expression (1) to be described, is developed by a current $I_{A2}$ resulting from an external fault. $I_{A2}$ is assumed to be 3 amperes which flows through an impedance path of $5\Omega(Z_{L2})$ and $3\Omega(Z_{S2Y})$ so as to develop a quantity $V_{A2}$ shown in FIG. 2, of 24 volts.

Typical line impedances such as $Z_{SX}$, $Z_L$ and $Z_{SY}$ are shown in FIG. 1. The impedance of the line between C.B.X and C.B.Y is shown in FIG. 1 as $Z_L$. For the following description of the selection of $Z_R$ the negative sequence component of $Z_{SX}$, $Z_L$, and $Z_{SY}$ (as referred to the relay input) are assigned the following values:

$Z_{S2X}$—7Ω
$Z_{L2}$—5Ω
$Z_{S2Y}$—3Ω

The quantity $Z_R$ is selected to have a value of 10Ω. Although a value of 10Ω for $Z_R$ is to be described, it should be recognized that a plurality of values may be selected for $Z_R$, and it is only necessary that $Z_R$ have a selected value in excess of 50 percent of the equivalent value of the negative sequence component of $Z_{SX}$ (as referred to the relay input) so that the desired $V_{OP}$ and $V_{REST}$ signals to be described may be developed.

I will now describe how the desired selection of $Z_R$ causes the circuit arrangement of FIG. 3 to operate in a desired manner in response to an external fault just behind the relay X. The quantity $I_{A2}$ created by such a typical external fault is assigned a value of 3 amperes (as referred to the relay input). As will be discussed hereinafter with regard to FIGS. 6 and 7, for the external fault the quantity $I_{A2}Z_R$ is an in-phase quantity and additive to $V_{A2}$ in the development of the $V_{OP}$ signal. The quantities $V_{A2}$, $I_{A2}Z_R$, $V_{OP}$ and $V_{REST}$ related to an external fault may be respectively shown by expressions 1, 2, 3, and 4 for RELAY X of FIG. 1:

$$V_{A2} = I_{A2}(Z_{L2} + Z_{S2Y}) \quad (1)$$
$$= (3a)(5\Omega + 3\Omega)$$
$$= 24 \text{ volts}$$

$$I_{A2}Z_R = (3a)(10\Omega) \quad (2)$$
$$= 30 \text{ volts}$$

$$V_{OP} = |V_{A2} + I_{A2}Z_R| \quad (3)$$
$$= (24 \text{ V}) + (30 \text{ V})$$
$$= |54 \text{ volts}|$$

$$V_{REST} = |I_{A2}Z_R| \quad (4)$$
$$= |(3a)(10\Omega)|$$
$$= |30 \text{ volts}|$$

From the relationship between expression (3) and (4) it is seen that the signals $V_{OP}$ exceed $V_{REST}$, and as will be further described hereinafter with regard to FIG. 7 the signal 68 (BLOCK) of FIG. 3 is generated.

To describe how the desired selection of $Z_R$ causes the circuit arrangement of FIG. 3 to operate in a desired manner in response to an internal fault mentioned above, the quantity $I_{A2}$ created by a typical internal fault is assigned the value of 5 amperes. As will be discussed hereinafter with regard to FIG. 6 for an internal fault the quantity $I_{A2}Z_R$ is an out-of-phase quantity and subtractive from $V_{A2}$ in the development of the $V_{OP}$ signal. The quantities $V_{A2}$, $V_{REST}$ and $V_{OP}$ related to an internal fault may be respectively shown by expressions 5, 6, and 7 for the RELAY X of FIG. 1:

$$V_{A2} = I_{A2}Z_{S2X} \quad (5)$$
$$= (5a)(7\Omega)$$
$$= 35 \text{ volts}$$

$$V_{REST} = |I_{A2}Z_R| \quad (6)$$
$$= |(5a)(10\Omega)|$$
$$= |50 \text{ volts}|$$

$$V_{OP} = |V_{A2} - I_{A2}Z_R| \quad (7)$$
$$= |35\text{ V} - 50\text{ V}|$$
$$= |-15 \text{ volts}|$$

From the relationship between expressions (6) and (7) it is seen that the signal $V_{REST}$ exceeds $V_{OP}$, and as will be further described hereinafter with regard to FIG. 6 the signal 68 (BLOCK) is not generated.

Further still, the RELAY X of my present invention operates correctly on power systems having parallel transmission lines. For example, assume (1) two transmission lines each having a $Z_{L2}$ impedance of 6Ω, (2) an impedance $Z_{S2X}$ of 7Ω, and (3) an occurrence of a fault along the transmission line 12 which is desired to be responded to by RELAY X as an internal fault and which fault creates a negative sequence fault voltage ($V_{A2F}$) of 35 volts. An impedance $Z_{L2}$ of 6Ω has been assumed in order to simplify the calculation to follow. For such conditions a total negative sequence current $I_{A2T}$ of 3.5 amperes flows from the Source X toward the location of the internal fault.

The quantity $I_{A2T}$ of 3.5 amperes typically divides approximately equally between the parallel transmission lines so that the RELAY X of transmission line 12 receives a negative sequence fault current $I_{A2}$ of 1.75 amperes. For the above assumptions and conditions the response of RELAY X may be expressed by relationships 8, 9, and 10:

$$V_{A2} = I_{A2T}Z_{S2X} \quad (8)$$
$$= (3.5a)(7\Omega)$$
$$= 24.5 \text{ volts}$$

$$V_{REST} = |I_{A2}Z_R| \quad (9)$$
$$= |(1.75a)(10\Omega)|$$
$$= |17.5 \text{ volts}|$$

$$V_{OP} = |V_{A2} - I_{A2}Z_R| \quad (10)$$
$$= |24.5\text{ V} - 17.5\text{ V}|$$
$$= |7.0\text{ V}|$$

From the relationship between expressions (9) and (10) it is seen that the signal $V_{REST}$ exceeds $V_{OP}$ and therefore the signal 68 (BLOCK) is not generated by the RELAY X.

The expressions (1)–(10) are related to the first embodiment of the present invention, that is the embodiment of FIG. 3 utilizing the $V_{A2}$ and $I_{A2}Z_R$ quantities developed by FIG. 2. However, the expressions (1)–(10) are also equally applicable to the second embodiment of the present invention by respectively substituting the quantities $V_O$ and $I_O Z_R$ developed by the circuit arrangement of FIG. 2 for the quantities $V_{A2}$ and $I_{A2}Z_R$. Further, for the second embodiment the $Z_R$ quantity is selected equal to or greater than one-half the equivalent zero sequence impedance behind the relay.

Figures 6, 7:
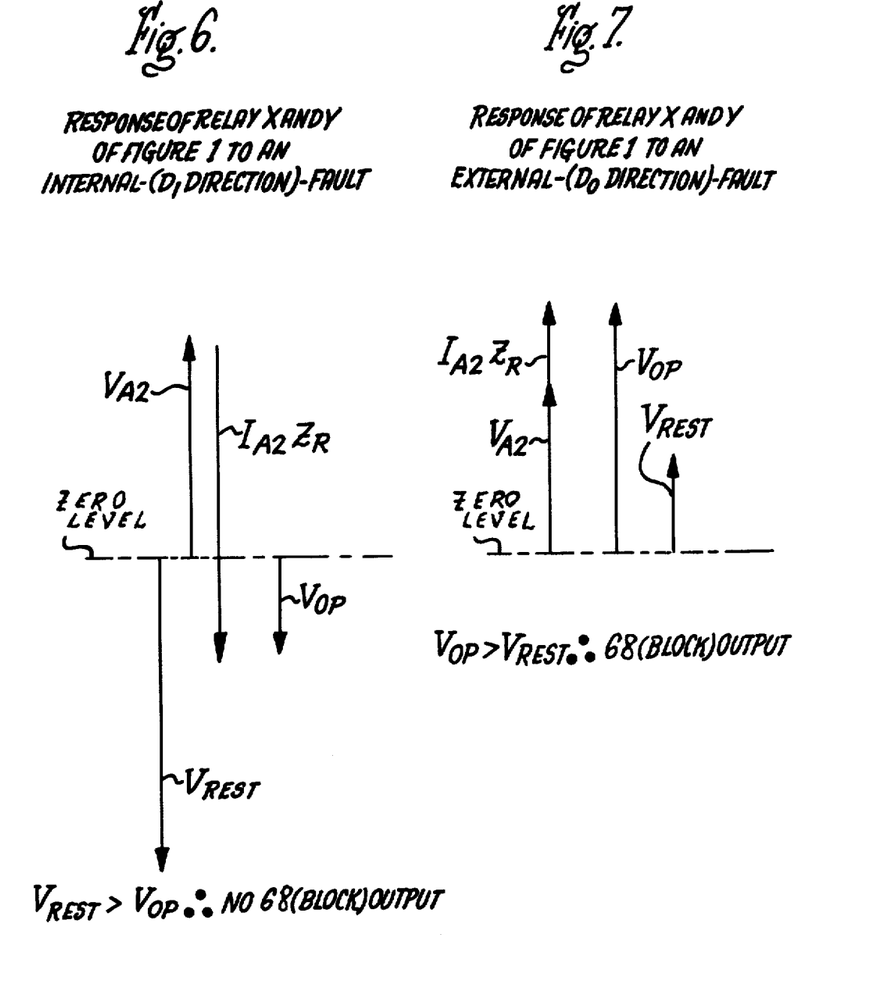
FIGS. 6 and 7 show respectively the operation of the circuit arrangement of FIG. 3 of the RELAYS of FIG. 1 to an Internal and External type fault.

The desired operation of the present invention described with regard to the selection of the $Z_R$ quantity is also dependent upon the phase relationships of the $V_{A2}$, $I_{A2}Z_R$, $V_{OP}$ and $V_{REST}$ all shown in FIGS. 6 and 7.

FIG. 6 shows the response of the previously discussed RELAY X, having a location shown in FIG. 1, to an internal fault in the direction of $D_1$ also shown in FIG. 1. The response of my RELAY Y, also shown in FIG. 1, is similar to that of FIG. 6. The relative dimensions and phase relationships of the phasor quantities $V_{A2}$, $V_{REST}$, and $V_{OP}$ of FIG. 6 are in accordance with the voltage quantities described for expressions (5), (6), and (7) respectively.

Further, the desired response of my RELAYS X and Y, shown in FIG. 6 is in accordance with the previously given description of expressions (5), (6), and (7). It should be noted that although $V_{OP}$ is shown as a negative quantity, in actuality it becomes a positive voltage by the rectifying operation of circuit arrangement of FIG. 3.

The operation of the circuit arrangement of FIG. 3 in response to the phasor quantities shown in FIG. 6 is illustrated by the expression $V_{REST} > V_{OP}$. No 68 (BLOCK) OUTPUT, which signifies that the $V_{REST}$ signal is greater than the $V_{OP}$ signal, and therefore circuit arrangement of FIG. 3 does not generate signal 68 (BLOCK).

FIG. 7 shows the response of the RELAY X, having its location as shown in FIG. 1, to an external fault in the direction $D_O$ also shown in FIG. 1. The response of my RELAY Y, also shown in FIG. 1, is similar to that of FIG. 7 for a fault in its $D_O$ direction. The relative dimensions and relationships of the phasor quantities $V_{A2}$, $I_{A2}Z_R$, $V_{OP}$ and $V_{REST}$ of FIG. 7 are in accordance with the voltage quantities described for expressions (1), (2), (3) and (4) respectively. Further, the described response of my RELAYS X and Y is in accordance with the previously given description of expressions (1), (2), (3) and (4).

The operation of the circuit arrangement of FIG. 3 in response to the phasor quantities shown in FIG. 7 is illustrated by the expression $V_{OP} > V_{REST}$. 68 (BLOCK) OUTPUT which signifies that the $V_{OP}$ signal is greater than the $V_{REST}$ signal and therefore circuit arrangement of FIG. 3 develops the signal 68 (BLOCK).

The discussion of FIGS. 6 and 7 describing the first embodiment of the present invention utilizing the $V_{A2}$ and $I_{A2}Z_R$ quantity is also applicable to the second embodiment of the present invention utilizing the quantities $V_O$ and $I_O Z_R$. For such a description and its related illustration of FIGS. 6 and 7 the quantities $V_O$ and $I_O Z_R$ respectively replace $V_{A2}$ and $I_{A2}Z_R$.

It should now be appreciated that the present invention provides a directional overvoltage relay utilizing negative and zero sequence components that correctly responds to external and internal faults that may occur along transmission line 12.

Figures 9, 10:
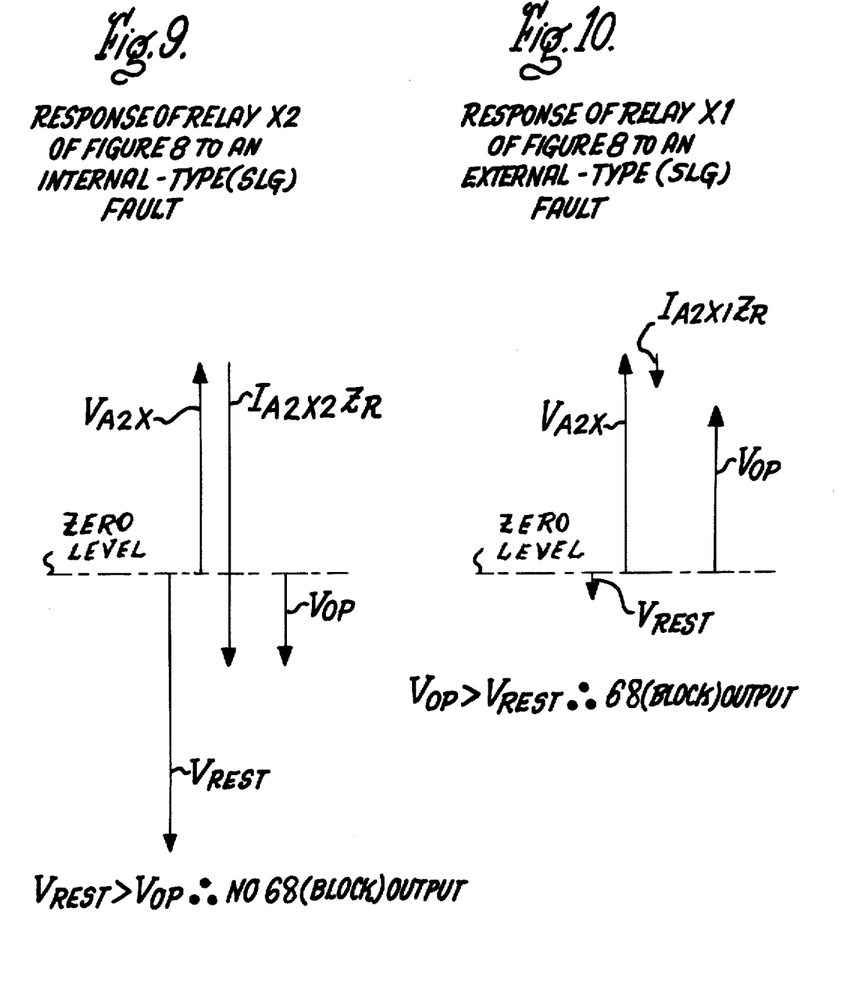
FIGS. 9 and 10 show, respectively, the response of relays X2 and X1 to the SLG fault shown in FIG. 8.

The present invention further provides for proper coordination and correct blocking or nonblocking operation for a pair of my RELAYS in response to faults that may occur on a line parallel to the line being protected. FIGS. 8, 9 and 10 are related to such fault occurrence on a parallel line.

FIG. 8 shows a first RELAY X1 and a circuit breaker C.B.X1 whose locations are similar to the previously described RELAY X and C.B.X both of FIG. 1. FIG. 8 further shows a second RELAY X2 and a circuit breaker C.B.X2 located on a line which is parallel to the transmission line related to RELAY X1. Still further, FIG. 8 shows the line related to RELAY X1 as having a circuit breaker C.B.Y1, and similarly the line related to RELAY X2 as having a circuit breaker C.B.Y2. The circuit breakers C.B.Y.1 and C.B.Y2 each have a respective RELAY Y1 and Y2, (not shown) both located in a similar manner as RELAY Y of FIG. 1. The lines related to RELAYS X1 and X2 are shown as interconnected by a Power BUS X and Power BUS Y. BUS X is the Power Bus at Source X end of the lines shown in FIG. 8, whereas, BUS Y is the Power Bus at Source Y end of the lines shown in FIG. 8.

FIG. 8 shows a location along the parallel line of RELAY X1 of a possible occurrence of a SINGLE-LINE-TO-GROUND (SLG) FAULT. This SLG fault may cause the development of the following quantities all shown in FIG. 1; (1) a current $I_{A2X}$ related to Source X, (2) a voltage potential $V_{A2X}$ related to BUS X, (3) a voltage potential $V_{A2Y}$ related to BUS Y, (4) a current $I_{A2X2}$ shown as a directional quantity flowing into and in front of RELAY X2, (5) a current $I_{A2Y2}$ shown as a directional quantity flowing into the fault from the BUS Y, (6) a current $I_{A2X1}$ shown as a directional quantity in front of RELAY X1 and which flows into a line shunt capacitance $X_C$, (7) a current $I_{A2Y1}$ shown as a directional quantity from the BUS Y and which flows into the line shunt capacitance $X_C$ and (8) a directional current quantity $I_{A2X1Y1}$, which is the sum of the quantities $I_{A2X1}$ and $I_{A2Y1}$, and flows into a shunt capacitor impedance $X_C$ shown in FIG. 8 along the line related to the RELAY X1. It should be noted that the shunt capacitor $X_C$ of FIG. 8 is similar to the capacitive shunt reactance discussed in the "Background" Section which created a misinterpretation by a typical directional relay between external and internal fault conditions. It should be further noted from FIG. 8 that the directional current quantities $I_{A2X1}$ and $I_{A2Y1}$ are shown by means of arrow length as being respectively substantially less than the directional current quantities $I_{A2X2}$ and $I_{A2Y2}$.

The correct operation of my invention (RELAY X1) is in accordance with the typical ratio of the source impedance $Z_{S2X}$ (or $Z_{S2Y}$) and the shunt capacitance impedance $X_C$. For example, assume that (when expressed as secondary quantities):

(1) $V_{A2X}$ as 30 volts;
(2) $Z_{S2X}$ and $Z_{S2Y}$ as 5 ohms and hence $Z_R$ of RELAY X has been selected as 7 ohms, and
(3) $X_C$ as 100 ohms.

For these assumptions $I_{A2X1Y1}$ will be approximately $V_{A2X}/X_C = 30/100 = 0.3$ amperes. $I_{A2X1}$ will be approximately one-half of $I_{A2X1Y1}$ or 0.15 amperes.

Thus the quantity $I_{A2X1}Z_R$ is equal to $(0.15a)(7\Omega) = 1.05$ volts.

For these conditions, $V_{OP}$ will be $30 V(V_{A2X}) - 1.05 V(I_{A2X1}Z_R) = 28.95$ volts and $V_{REST}(I_{A2X1}Z_R)$ will be 1.05 volts. Therefore, $V_{OP}$ is very much larger than $V_{REST}$ and hence RELAY X1 operates so as to generate the signal 68 (BLOCK) OF FIG. 3.

By comparison, RELAY X2 does not operate to generate the signal 68 (BLOCK) of FIG. 3. The nonoperation is produced because $I_{A2X2}$ will be equal in magnitude to $I_{A2X}-I_{A2X1}$. From the above assumption $I_{A2X2}$ is equal to $V_{A2X}/Z_{S2X}-I_{A2X1}=(30 V/5\Omega)-(0.15)=5.85$ amperes.

For this condition $V_{OP}$ of RELAY X2=$V_{A2X}-I_{A2X2}Z_R=30$ V$-(5.85a)\cdot(7\Omega)=30-40.95=10.95$ volts. Further, the $V_{REST}$ quantity of RELAY X2=$I_{A2X2}Z_R=40.95$ volts. The $V_{REST}$ quantity exceeds the $V_{OP}$ quantity and accordingly the signal 68 (BLOCK) is not generated by the circuit arrangement of FIG. 3 for the X2 RELAY.

The response of the RELAYS X2 and X1 of FIG. 8 are graphically shown in FIGS. 9 and 10 respectively. FIG. 9 is similar to the previously described FIG. 6. The relative dimensions and directions of the $V_{A2X}$, $I_{A2X2}Z_R$, $V_{REST}$ and $V_{OP}$ of FIG. 9 are similar to the quantities $V_{A2}$, $I_{A2}Z_R$, $V_{REST}$ and $V_{OP}$ described for FIG. 6.

The operation of the circuit arrangement of FIG. 3 in response to the phasor quantities shown in FIG. 9 is illustrated by the expression $V_{REST}>V_{OP}$. No 68 (BLOCK) OUTPUT which signifies that $V_{REST}$ is greater than $V_{OP}$ and therefore a signal 68 (BLOCK) is not generated.

FIG. 10 shows the response of the RELAY X1 to the SLG fault both shown in FIG. 8. A comparison between FIGS. 9 and 10 reveals that the quantity $I_{A2X2}Z_R$ of FIG. 9 comprising $V_{REST}$ is relatively large compared to $V_{OP}$, whereas, the quantity $I_{A2X1}$ of FIG. 10 comprising $V_{REST}$ is relatively small compared to $V_{OP}$. This is the essential function in the different responses shown in FIGS. 9 and 10. The essential difference has been previously described with regard to the correct operation of my invention in accordance with typical ratio between the source impedance $Z_{S2X}$ (or $Z_{S2Y}$) and the shunt impedance $X_C$, all shown in FIG. 8. In accordance with these typical calculations related to RELAYS X1 and X2 created by the SLG fault of FIG. 8 the circuit arrangement of FIG. 3 cause the response as shown in FIG. 10.

The response of circuit arrangement of FIG. 3 to the phasor quantities of FIG. 10 is illustrated by the expression $V_{OP}>V_{REST}$. 68 (BLOCK) OUTPUT which signifies the $V_{OP}$ is greater than $V_{REST}$ and therefore the signal 68 (BLOCK) is generated.

In a manner as previously described the operation illustrated by FIGS. 9 and 10 showing phasor quantities related to the quantities $V_{A2}$ and $I_{A2}Z_R$ of embodiment 1 are equally applicable to phasor quantities related to the quantities $V_O$ and $I_OZ_R$ of embodiment 2.

It should now be appreciated that the present invention provides a directional overvoltage relay located on parallel transmission lines and utilizing negative or zero sequence components which correctly responds to external and internal fault conditions that may occur along either parallel transmission line.

It should be recognized that although the description of quantities $V_{A2}$, $V_O$, $I_{A2}Z_R$ and $I_OZ_R$ of FIGS. 6, 7, 9 and 10 does not refer to in detail to related adjustment constants such as $K_1$, $K_2$ or $K_3$, the circuit arrangement of FIG. 3 provides for such adjustments. More particularly, the Magnitude Adjust ($K_1$) 51 provides a $K_1$ related to the quantities $V_{A2}$ and $V_O$. The Magnitude Adjust ($K_2$) 54 provides a $K_2$ constant related to the quantities $I_{A2}Z_R$ and $I_OZ_R$ in their development of $V_{REST}$ signal. Still further, the quantities $I_{A2}Z_R$ and $I_OZ_R$ used for the development of $V_{OP}$ signal has two adjustment constants, $K_2$ provided by Magnitude Adjust 54 and $K_3$ provided by Magnitude Adjust 55. Considering these three constants $K_1$, $K_2$ and $K_3$ it is realized that a plurality of adaptable $V_{OP}$ and $V_{REST}$ quantities may be selected for various conditions. For example, Magnitude Adjust ($K_1$) 53 and ($K_2$) 54 provide a practical means of adjusting the magnitude of $I_{A2}Z_R$ relative to $V_{A2}$. Magnitude Adjust ($K_3$) 55 provides the ability to bias the overvoltage directional unit to operate in the absence of negative sequence voltage by making $K_3$ slightly greater than unity. $K_3$ also provides means for special settings that may be required for some applications involving series capacitors.

It should be further appreciated that my invention is not hindered, as previously mentioned, by travelling wave currents that typically occur along the transmission line and which are typically created by fault occurrences. My invention in its development of the $V_{OP}$ signal responds rapidly due to the typical fault generation of a large $V_{A2}$ quantity. Further, my invention in its development of $V_{OP}$ enhances its speed of response because the $I_{A2}$ typically created by a fault condition is initially limited by the surge impedance of the transmission line. The rapid response of my invention to the large voltage $V_{A2}$ quantity not having undesirable frequency components associated with the travelling wave is therefore not hindered by the troublesome travelling wave.

Still further, it should be appreciated that my invention by its rapid response avoids or even eliminates the adverse tripping problems typically created by the saturation of an adversely located current transformer (CT) discussed in the "Background" Section. The adverse tripping is prevented by the blocking relays of my present invention operating in a relatively fast manner before the current transformers are driven into their adverse saturation condition.

While I have shown and described particular embodiments of my invention, it will be obvious to those skilled in the art that various changes and modifications may be made without departing from my invention in its broader aspects; and I, therefore, intend herein to cover all such changes and modifications as fall within the true spirit and scope of my invention.

What I claim is:

1. An overvoltage directional relay for association with a three phase transmission line and adapted to provide a blocking signal in response to the occurrence of a fault behind the relay but providing no blocking signal in response to the occurrence of a fault on the transmission line in front of the relay, the relay comprising:

(a) means for developing quantities $V_2$ and $I_2Z_R$, where:

$V_2$ is a signal representative of the negative sequence component of the phase to ground or phase to phase voltages of the transmission line, $I_2$ is a signal representative of the negative sequence component of the phase currents of the transmission line when $V_2$ is related to phase to ground voltage and is a signal representation of the negative sequence component of the delta currents when $V_2$ is related to phase to phase voltage, $Z_R$ is a replica impedance of the equivalent negative sequence source impedance behind the relay and is of a magnitude equal to or greater than one-half of said equivalent negative sequence source impedance, (b) summing means for summing $K_1V_2$ and $(K_2)$ $(K_3)I_2Z_R$ and developing an operating signal $V_{OP}$ which is proportional to the sum of $K_1V_2$ and $(K_2)$ $(K_3)$ $(I_2Z_R)$, where $K_1$, $K_2$, and $K_3$ are selectable constants, (c) means for developing a restraining signal $V_{REST}$ which is proportional to $(K_2)$ $(I_2Z_R)$, (d) amplitude comparator means for comparing the amplitude of operation signal $V_{OP}$ with the amplitude of the restraining signal $V_{REST}$ and for developing a blocking signal when the amplitude of $V_{OP}$ exceeds $V_{REST}$.

2. An overvoltage directional relay for association with a three phase transmission line and adapted to provide a blocking signal in response to the occurrence of a fault behind the relay but providing no blocking signal in response to the occurrence of a fault on the transmission line in front of the relay, the relay comprising:

(a) means for developing quantities $V_O$ and $I_OZ_R$, where $V_O$ is a signal representative of the zero sequence component of the phase to ground voltages of the transmission line, $I_O$ is a signal representative of the zero sequence component of the phase currents of the transmission line;

$Z_R$ is a replica impedance of the equivalent zero sequence source impedance behind the relay and is of a magnitude equal to or greater than one-half of said equivalent negative sequence source impedance, (b) summing means for summing $K_1V_O$ and $(K_2)$ $(K_3)$ $I_OZ_R$ and developing an operating signal $V_{OP}$ which is proportional to the sum of $K_1V_O$ and $(K_2)$ $(K_3)$ $(I_OZ_R)$, where $K_1$, $K_2$ and $K_3$ are selectable constants, (c) means for developing a restraining signal $V_{REST}$ which is proportional to $(K_2)$ $(I_OZ_R)$, and (d) amplitude comparator means for comparing the amplitude of operating signal $V_{OP}$ with the amplitude of the restraining signal $V_{REST}$ and for developing a blocking signal when the amplitude of $V_{OP}$ exceeds $V_{REST}$.

3. The overvoltage directional relay according to claim 1 in which the means for developing the quantities $V_2$ and $I_2Z_R$ develops a quantity $I_2Z_R$ which (a) is of opposite polarity to that of quantity $V_2$ in response to a fault in front of the relay, and (b) is of the same polarity to quantity $V_2$ in response to a fault behind the relay.

4. The overvoltage directional relay according to claim 1 in which the means for developing the quantities $V_O$ and $I_OZ_R$ develops a quantity $I_OZ_R$ quantity $V_O$ in response to a fault in front of the relay, and (b) is of the same polarity to quantity $V_O$ in response to a fault behind the relay.

5. The overvoltage directional relay according to claim 1 wherein said amplitude comparator means has further means for controlling its operating time response in its development of said BLOCK signal, said operating time response being essentially determined by the amplitude of the $V_{OP}$ signal such that said blocking signal is developed relatively fast for large $V_{OP}$ signals, and conversely, said blocking signal is developed relatively slow for small $V_{OP}$ signals.

6. The overvoltage directional relay according to claim 2 wherein said amplitude comparator means has further means for controlling its operating time response in its development of said blocking signal, said operating time response being essentially determined by the amplitude of the $V_{OP}$ signal such that said blocking signal is developed relatively fast for large $V_{OP}$ signals, and conversely, said blocking signal is developed relatively slow for small $V_{OP}$ signals.

7. The overvoltage directional relay according to either claim 5 or claim 6 wherein said means for controlling the operating response time comprises:

second summing means having a positive input for receiving said $V_{OP}$ signal and a negative input for receiving said $V_{REST}$ signal, said summing means developing a negative level output signal when $V_{OP}$ signal exceeds the $V_{REST}$ signal;

a circuit arrangement receiving the output from said second summing means and for developing after a time delay a positive level output signal in response to receipt of said negative level output signal of said second summing means, level detector means receiving said positive level output signal of said circuit arrangement and generating said blocking signal when said positive level output signal equals or exceeds a predetermined positive level.

8. The overvoltage directional relay according to claim 7 wherein said circuit arrangement comprises a first resistor $R_1$, a second resistor $R_2$, a capacitor $C_1$, and an amplifier, said resistor $R_1$ coupled to the input stage of said amplifier and also coupled to one end of each resistor $R_2$ and $C_1$ which are arranged in a parallel manner, said $R_2$ and $C_1$ coupled between the input stage of amplifier and the output stage of the amplifier.

9. The overvoltage directional relay according to claim 1 wherein said amplitude comparator means further comprises means for delaying the development of said blocking signal until the $V_{OP}$ signal exceeds the $V_{REST}$ signal for a predetermined duration.

10. The overvoltage directional relay according to claim 2 wherein said amplitude comparator means further comprises means for delaying the development of said blocking signal until the $V_{OP}$ signal exceeds the $V_{REST}$ signal for a predetermined duration.

11. The overvoltage directional relay according to either claim 9 or claim 10 wherein said means for delaying comprises:

summing means receiving said $V_{OP}$ and $V_{REST}$ signal and substantially instantaneously generating an output signal when the amplitude of said $V_{OP}$ signal exceeds the amplitude of said $V_{REST}$ signal;

a timer for receiving said summing means output signal and having a preselected time delay, said preselected time delay providing said predetermined duration, said timer developing said blocking signal in response to the presence of said summing means output for a time duration equal to or greater than said predetermined duration.

* * * * *